United States Patent [19]

Arita

[11] Patent Number: 4,829,508
[45] Date of Patent: May 9, 1989

[54] CARRIAGE TILT CONTROL IN AN OPTICAL DISK PLAYER

[75] Inventor: Manabu Arita, Saitama, Japan

[73] Assignee: Pioneer Electronic Corporation, Saitama, Japan

[21] Appl. No.: 165,055

[22] Filed: Mar. 7, 1988

[30] Foreign Application Priority Data

Mar. 6, 1987 [JP] Japan ............................. 62-32896[U]

[51] Int. Cl.⁴ ...................... G11B 17/00; G11B 21/02
[52] U.S. Cl. .................................. 369/215; 369/244; 369/249
[58] Field of Search ............... 369/244, 256, 249, 215, 369/219, 220, 221; 360/107, 109, 99

[56] References Cited

FOREIGN PATENT DOCUMENTS 162614 11/1985 European Pat. Off. ............ 369/215
206929 9/1986 Japan .................................. 369/249

Primary Examiner—Steven L. Stephan
Attorney, Agent, or Firm—Sughrue, Mion, Zinn, Macpeak & Seas

[57] ABSTRACT

An optical disk player having a pickup which can be automatically tilted to conform to an angle of the optical disk. When the pickup fails to detect a reproducible signal, due to dropout or the like, the angle of the pickup is returned to a predetermined value.

8 Claims, 4 Drawing Sheets

CARRIAGE TILT CONTROL IN AN OPTICAL DISK PLAYER

BACKGROUND OF THE INVENTION

1. Field Of The Invention

The present device relates to an optical disk player, particularly to an optical disk player having a tilt servo mechanism by which the recording surface of an optical information recording disk and the optical axis of light irradiated upon the recording surface are kept perpendicular to each other.

2. Background Art

FIG. 8 shows a major part of a conventional optical disk player in which a disk 1 is on a turntable 3 which is rotated by a spindle motor 2. The disk 1 is pushed on the turntable 3 by a clamp mechanism including a clamper 4. The disk 1 may be deformed as a dish with its concave side facing down. The spindle motor 2 is secured to a fixed base 5. A movable base 6 is attached to the fixed base 5 by a support pin 7 so that the movable base can swing in a direction P. A guide shaft 8 is provided on the movable base 6 and supports a carriage 9 so that the carriage 9 is slidable on the guide shaft 8. An optical pickup is housed in the carriage 9. The optical pickup comprises an optical system including an objective lens 10 and a lens servomechanism for performing the servo driving of the objective lens 10 in a direction of focusing and in a direction of tracking. The optical pickup functions so that laser light is irradiated upon the recording surface of the disk 1, the laser light is reflected by the recording surface and received by the optical pickup, and the change in the reflected laser light is detected to read recorded information. A carriage drive (not shown in FIG. 8) moves the carriage 9 along the guide shaft 9 and a base rotator (not shown in FIG. 8) applies a swinging force to the movable base 6 to rotate it relative to the fixed base 5. Both the driver and the rotator are provided in the optical disk player. A detector (not shown in FIG. 8) comprising a light emission element and a light reception element, for example, is provided on the carriage 9 to detect the angle of relative tilt between the optical axis of the laser light and the recording surface of the disk 1 and to generate a detection signal. When the carriage 9 is moved outward in the radial direction of the disk 1 along its recording surface, the detection signal is sent from the detector to a control circuit so that the control circuit acts to appropriately operate the base rotator depending on the detection signal to keep the optical axis of the irradiated laser light and the recording surface of the disk perpendicular to each other.

When a dropout occurs in the optical disk player due to a flaw in the recording surface of the disk 1 or the like so that a reproduced signal is not generated, a tilt servo means is likely to perform an improper tilting operation so that the movable base 6 is excessively swung and the pickup including the carriage 9 abnormally approaches the disk.

If the conventional optical disk player is of such a type that the tilt servo operation is not performed when the carriage 9 is moved toward the radially innermost portion of the recording region of the disk 1 after the end of reproduction, the carriage 9 which is greatly tilted to correspond to the greatly tilted radially outer part of the disk 1 as shown in FIG. 8 is moved inward in the radial direction of the disk 1 along its recording surface so that the pickup likewise abnormally approaches the disk.

For these reasons, the conventional optical disk player is provided with an abnormal approach prevention mechanism for detecting the above-mentioned abnormal approach beforehand and it thus prevents the misoperation. However, since the abnormal approach prevention mechanism includes expensive components such as a detection switch and the number of the component parts of the mechanism is large, the cost of the mechanism is high.

SUMMARY OF THE INVENTION

The present device was invented in consideration of the above-mentioned circumstances.

Accordingly, it is an object of the present device to provide an optical disk player in which the abnormal approach of an optical pickup to a disk is prevented by a low cost mechanism and which is easily made compact as a whole.

The optical disk player provided in accordance with the present device is characterized in that when a reproduced signal is not generated by a reproduction processing means including an optical pickup, the tilt servo operation of a tilt servo means is stopped so that the optical axis of the optical pickup is returned to a fixed returned position.

DETAILED DESCRIPTION OF THE PREFERRED EMBODIMENT

A major part of an optical disk player which is an embodiment of the present device is hereafter described with reference to the drawings attached hereto. Since the design of the optical disk player resembles that of the conventional optical disk player shown in FIG. 8, the equivalent or corresponding portions shown in FIGS. 1 through 8 are denoted by the same reference numbers.

Figure 1:
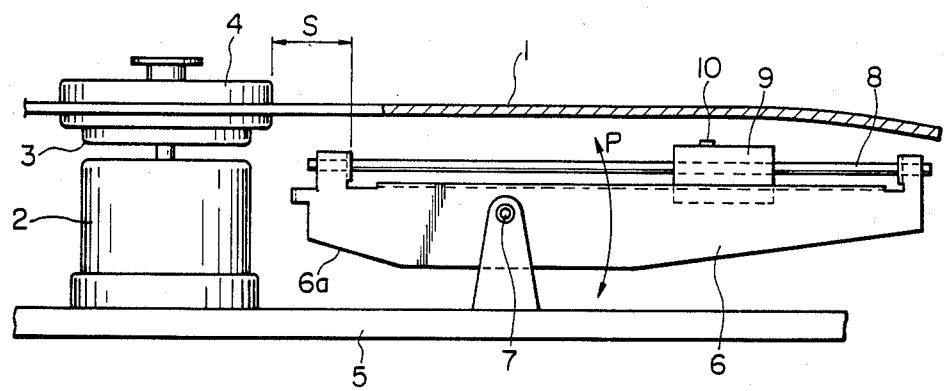
FIG. 1 shows a partially-sectional side view of a major part of an optical disk player which is an embodiment of the present device.
Figure 2:
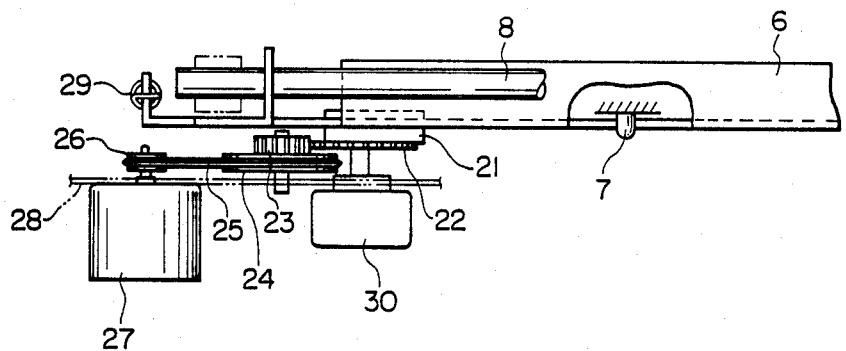
FIGS. 2, 3, 4 and 5 illustrate a tilt servo mechanism.
Figure 3:
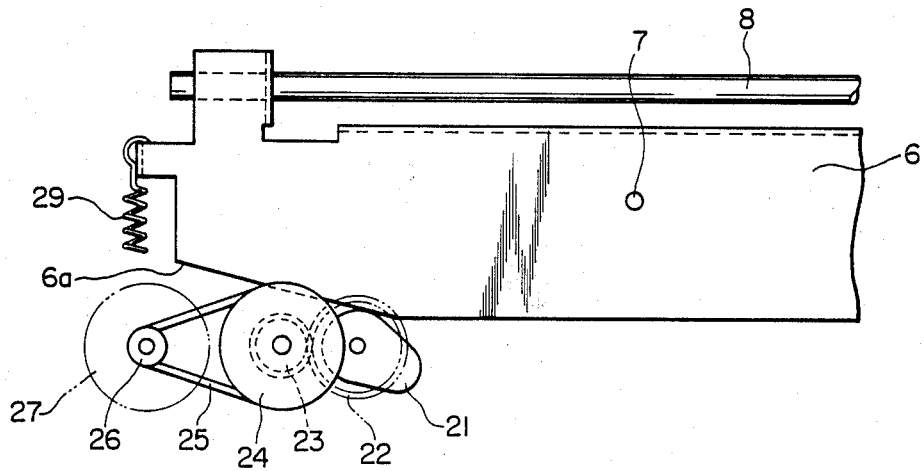

As shown in a side view in FIG. 1, a cam contact surface 6a is provided at one end of a movable base 6 attached to a fixed base 5 by a support pin 7 so that the movable base 6 is swingable. As shown in a top view in FIG. 2 and in a side view in FIG. 3, a cam 21 is in touch with the cam contact surface 6a. The cam 21 is coaxial with a gear 22 and is rotated by a motor 27 through a gear 23, a pulley 24, a belt 25 and a small pulley 26. The gears 22 and 23 and the pulleys 24 and 26 are attached to a vertical bracket 28 provided on the fixed base 5, as shown in FIG. 2. A helical spring 29 biases the movable base 6 in a counterclockwise direction in FIG. 3 and is coupled to the movable base 6 near the cam contact surface 6a so that the movable base is swung in opposing directions by the rotation of the motor 27 and the biasing force of the helical spring 29.

As shown in FIG. 2, a rotary potentiometer 30 is provided so that it operates in conjunction with the movement of the cam 21 and the gear 23. A tilt control circuit 37 mentioned hereafter with respect to FIG. 6 includes a comparator which compares the terminal voltage of the potentiometer 30 with a reference voltage.

Figure 4:
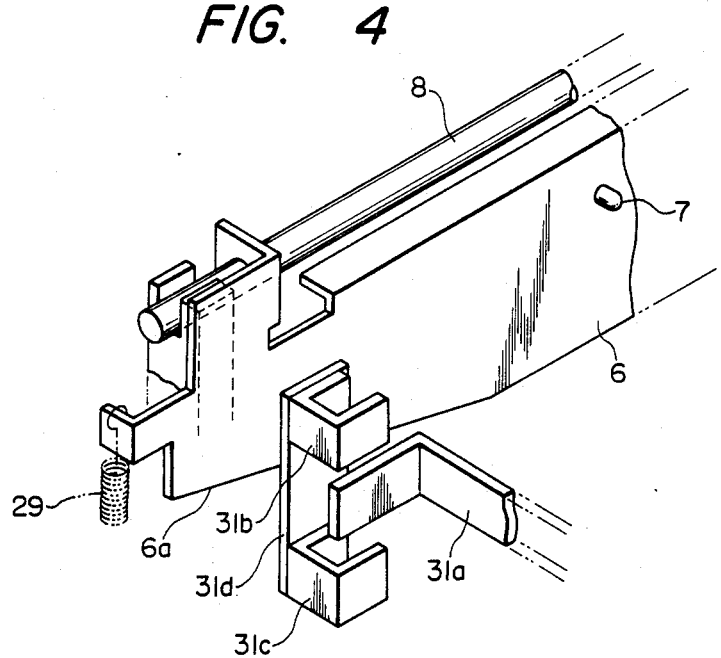

As shown in FIG. 4, photosensors 31b and 31c (each comprising an emitter and detector on opposing arms) detect, in cooperation with a blocking plate 31a secured to the fixed base 5, that the movable base 6 is swung to a reference position between the photosensors 31b and 31c. The photosensors 31a and 31b are attached to the free end of the movable base 6 by an attaching plate 31d. The potentiometer 30, the blocking plate 31a and the photosensors 31b and 31c constitute a detector for detecting the swung position of the movable base 6.

Figure 5:
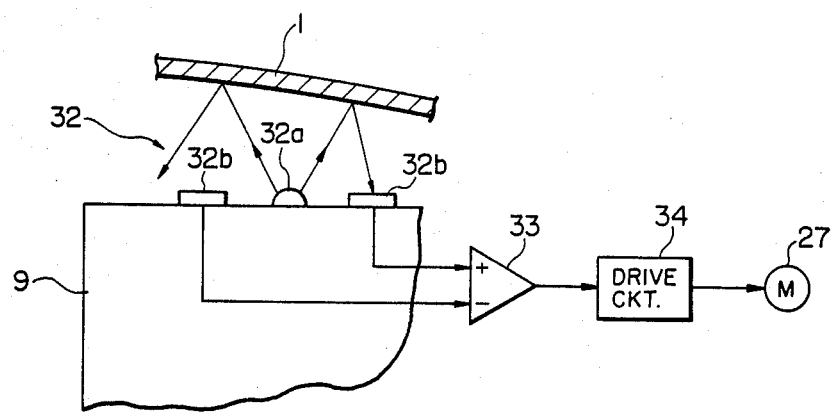

As shown in FIG. 5, an optical sensor 32 detects the angle of relative tilt between the recording surface of a disk 1 and the optical axis of laser light irradiated upon the recording surface through an objective lens 10 (shown in FIG. 1) and thereby generates a detection signal. The optical sensor 32 is located on a carriage 9 near the objective lens 10. The optical sensor 32 comprises one light emission element 32a and two light reception elements 32b. Light is emitted from the light emission element 32a, reflected by the disk 1 and received by the light reception elements 32b. The difference between the quantities of the light received by the two light reception elements 32b is determined by a differential amplifier 33, the output from which is applied as the quantity of the relative tilt to the motor 27 through a drive circuit 34.

Figure 6:
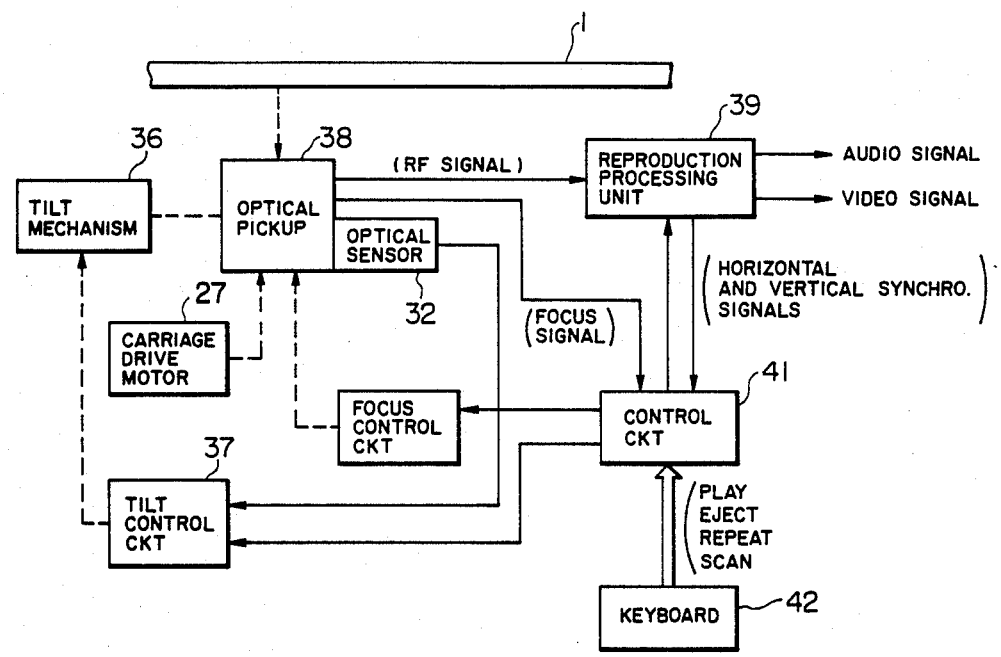
FIG. 6 shows a block diagram of the control system of the optical disk player.
Figure 8:
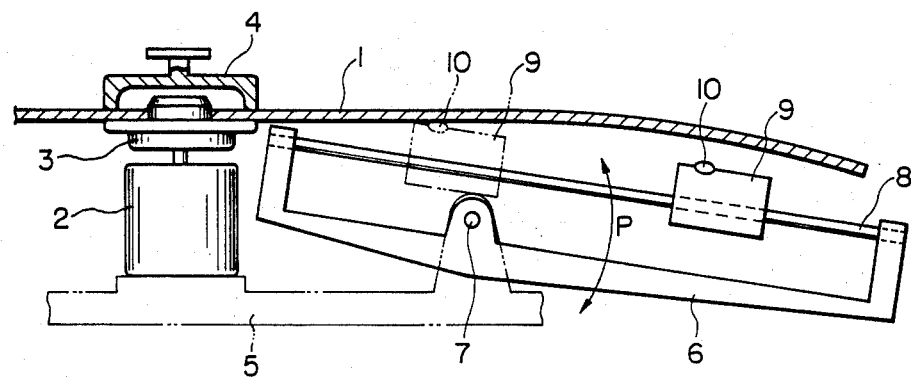
FIG. 8 illustrates a conventional optical disk player.

The movable base 6, the support pin 7, the cam 21, a cam rotation mechanism, which includes the motor 27 and so forth and acts to rotate the cam 21, and the helical spring 29, which biases the movable base 6, constitute a tilt mechanism 36 shown in FIG. 6.

A tilt control circuit 37 shown in FIG. 6 includes the differential amplifier 33 and the drive circuit 34. The tilt mechanism 36 and the tilt control circuit 37 constitute a tilt servo means for controlling the optical axis for an optical pickup 38 to keep the optical axis and the recording surface of the disk 1 perpendicular to each other.

A reproduction processing circuit 39 shown in FIG. 6 performs the reproduction processing of an information signal obtained from the optical pickup 38 and operates to generate a reproduced signal. A signal such as a horizontal and a vertical synchronizing signal and an identification signal is sent from the reproduction processing circuit 39 to a control circuit 41. A focus signal indicating the degree of focusing is sent from the optical pickup 38 to the control circuit 41. Operation command signals for playing, ejection, repetition, scanning or the like are sent from a keyboard 42 to the control circuit 41.

Figure 7:
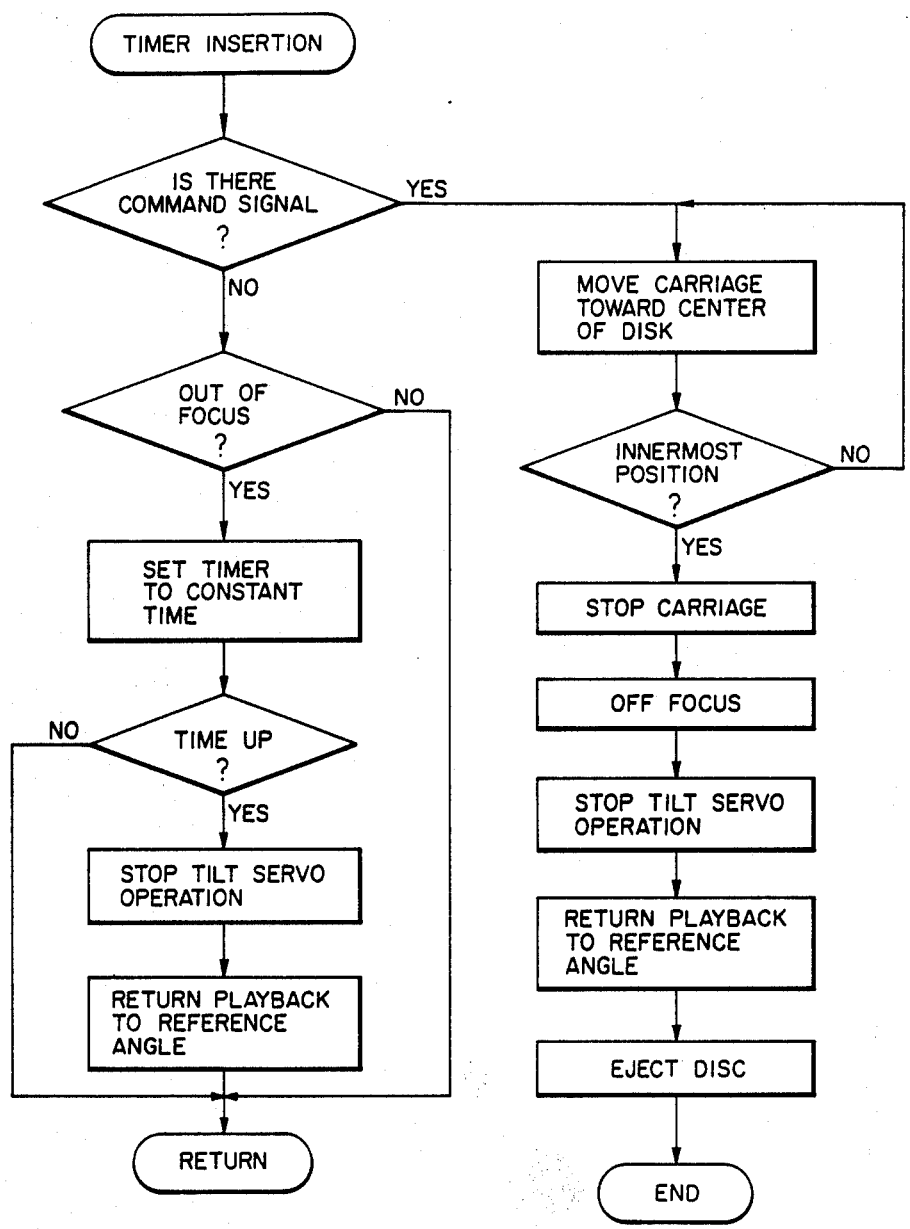
FIG. 7 describes the operation of the optical disk player.

The operation of a control system described above is now described in detail with reference to FIG. 7. When the recording surface disk 1 has gone out of focus due to a dropout or the like during the reproduction of the disk 1 so that the reproduced signal (e.g., horizontal and vertical synchronization signals) has not been obtained for a prescribed time, the control circuit 41 stops the tilt servo operation of the tilt servo means. At the same time, the control circuit 41 acts to rotate the motor 27 forward or backward to move the movable base 6 back to its horizontal position thereof to make the carriage 9 parallel with the disk bearing surface of a turntable 3 to return the optical axis of the optical pickup to its predetermined returned position. The returned position can be detected by the photosensors 31a and 31b. As shown in FIG. 7, the return is also performed when the carriage 9 is instructed to move to the radially innermost portion of the recording region of the disk 1. As a result, the optical pickup including the carriage 9 is prevented from abnormally approaching the disk 1.

If the disk 1 to be reproduced by the optical disk player is a combined disk having both the recording region of a video disk of larger diameter and the recording region of a compact disk of smaller diameter, the distance S between the limit of the radially inward movement of the optical pickup and the peripheral edge of the turntable 3, as shown in FIG. 1, needs to be made as small as possible because the radius from the center of the compact disk to its signal recording start position is small. In reality, when the pickup is in a position corresponding to the signal recording start position of the compact disk section of the combined disk, it partially overlaps the peripheral edge of the turntable in the horizontal direction. fSince the pickup in that position is always parallel with the disk bearing surface of the turntable in the optical disk player which is the embodiment of the present device, the space occupied by the pickup in that position can be made smaller than that in a conventional optical disk player whose pickup is returned to such a position while remaining tilted. For that reason, the optical disk player which is the embodiment of the present device can easily be made compact.

In an optical disk player provided in accordance with the present device, the tilt servo operation of a tilt servo means is stopped and the optical axis of an optical pickup is returned to a fixed returned position when a reproduced signal is not obtained by a reproduction processing means including the optical pickup. As a result, the abnormal approach of the optical pickup to a disk, which would conventionally be prevented by an abnormal approach prevention mechanism including a detection switch and so forth, is prevented through the circuit operation of the optical disk player. For that reason, the number of components of the optical disk player is decreased to make it easy to reduce the cost and size of the optical disk player as a whole.

Since the optical pickup is always parallel with the disk bearing surface of a turntable when the pickup is in a position corresponding to the radially innermost portion of the recording disk near the turntable, the space occupied by the pickup in that position can be made smaller than that in a conventional optical disk player whose pickup is returned to such a position while remaining tilted. This also results in making it easy to reduce the size of the optical disk player provided in accordance with the present device.

What is claimed is:

1. An optical disk player, comprising:
    playing means including an optical pickup for reading information from a rotating optical information recording disk;
    reproduction processing means for generating a reproduced signal from an information signal obtained from said playing means;
    tilt servo means for controlling an angle of an optical axis of said pickup; and
    returning means responsive to signals from said optical pickup for stopping a servo operation of said tilt servo means and for returning said angle of said optical axis of said pickup to a predetermined angle.

2. An optical disk player as recited in claim 1, wherein said returning means respond to a lack of generation of said reproduced signal by said reproduction processing means for initiating said stopping and said returning.

3. An optical disk player as recited in claim 2, wherein said reproduced signal is a synchronization signal.

4. An optical disk player as recited in claim 1, wherein said returning means comprises a timer and removing means responds to said lack of said reproduced signal continuing during a running of said timer.

5. An optical disk player as recited in claim 1, wherein said returning means comprises an optical detector for detecting said predetermined angle.

6. An optical disk player as recited in claim 1, wherein said tilt servo means includes a shaft along which said playing means is slidable, a rotatable base holding said shaft and rotation means for rotating said rotatable base.

7. An optical disk player as recited in claim 6, further comprising moving means for moving said playing means along said shaft between a radially inner portion and a radially outer portion of said disk and wherein said returning means are additionally responsive to said moving means moving said playing means to said radially inner portion for initiating said returning.

8. An optical disk player, comprising:

playing means including an optical pickup for reading information from a rotating optical information recording disk;

reproduction processing means for generating a reproduced signal from an information signal obtained from said playing means;

tilt servo means for controlling an angle of an optical axis of said pickup; and returning means responsive to a lack of generation of said reproduced signal by said reproduction processing means for stopping a servo operation of said tilt servo means and for returning said angle of said optical axis of said pickup to a predetermined angle.

* * * * *